United States Patent [19]

Szczepanski et al.

[11] 4,008,377
[45] Feb. 15, 1977

[54] ARRANGEMENT FOR REGISTERING AND READING OF MESSAGE UNITS IN TELEPHONE EXCHANGES

[75] Inventors: Jerzy W. Szczepanski; Wieslaw Wilczynski, both of Warsaw, Poland

[73] Assignee: Politechnika Warszawska, Warsaw, Poland

[22] Filed: Sept. 5, 1975

[21] Appl. No.: 610,733

Related U.S. Application Data

[63] Continuation-in-part of Ser. No. 421,634, Dec. 4, 1973.

[30] Foreign Application Priority Data

Dec. 7, 1972  Poland .......................... 159356

[52] U.S. Cl. .......................... 179/7 R; 179/7.1 TP
[51] Int. Cl.² ...................................... H04M 15/12
[58] Field of Search ............ 179/7 R, 7.1 R, 7.1 TP

[56] References Cited
UNITED STATES PATENTS

| | | | |
|---|---|---|---|
| 3,267,216 | 8/1966 | Raab et al. | 179/7.1 TP |
| 3,514,540 | 5/1970 | Widdell | 179/7 R |
| 3,794,783 | 2/1974 | Radu | 179/7.1 TP |
| 3,936,608 | 2/1976 | Danielson | 179/7.1 R |

Primary Examiner—Kathleen H. Claffy
Assistant Examiner—Gerald L. Brigance

[57] ABSTRACT

An arrangement for registering and reading message units for calls in a telephone or Telex exchange to allow automatic billing for calls and presenting the bills to the subscribers of the exchanges. Electrochemical integrators are connected so that one of their electrodes is connected to ground potential, whereas the other electrodes of these integrators are connected over resistors to wires conducting metering pulses to individual equipments of exchange lines. The latter electrodes during the reading process become connected over a commutator to a reading device having threshold means detecting the increase of voltage on terminals of the integrator. A generator provides square pulses having their polarization opposite to that of the metering pulses. The output of the generator is connected to a gate having its other input connected to the threshold means. The output of the gate is connected to the input of the pulse counter. The output of the pulse counter and the output of the commutator are connected with a device for registering the read pulses and commutator position.

4 Claims, 1 Drawing Figure

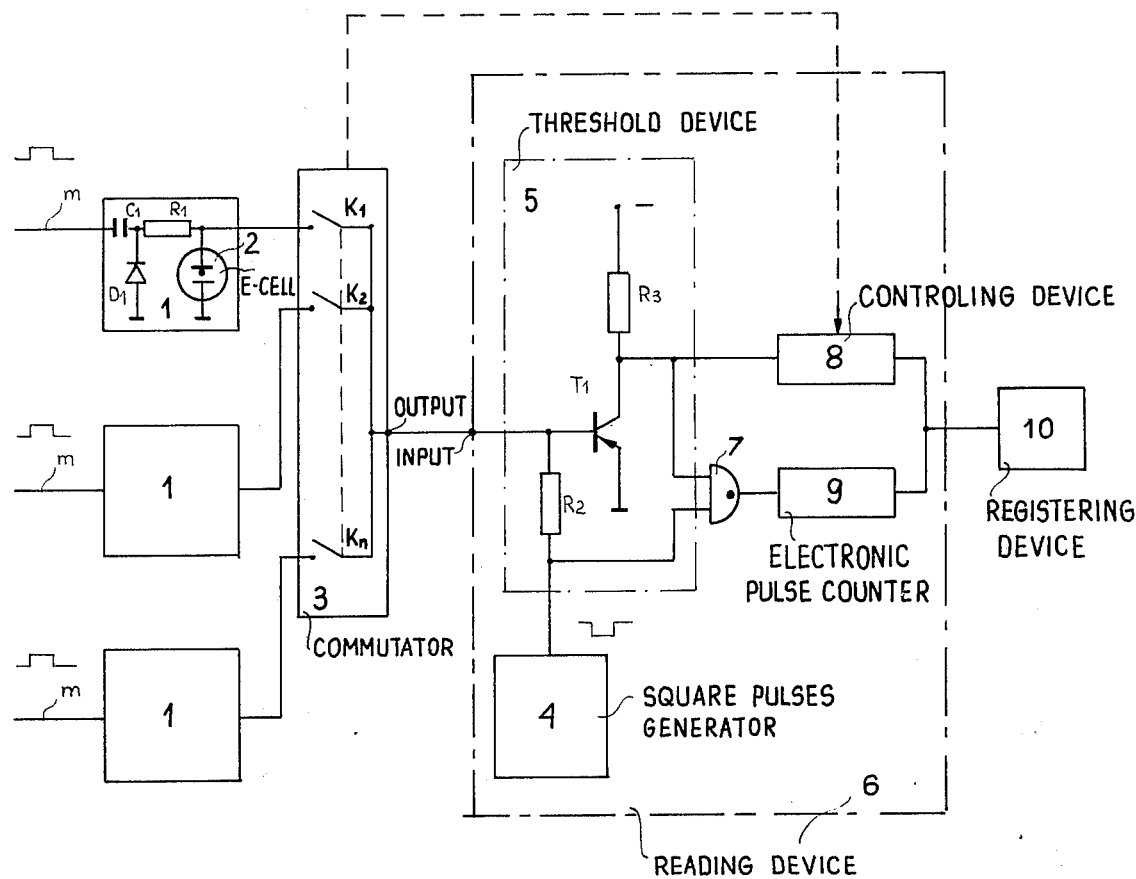

ARRANGEMENT FOR REGISTERING AND READING OF MESSAGE UNITS IN TELEPHONE EXCHANGES

BACKGROUND OF THE INVENTION

The present application is a continuation-in-Part of the parent application Ser. No. 421,634, filed Dec. 4, 1973.

The present invention relates to an arrangement for registering and reading of message units for calls in a telephone or Telex exchange, enabling a full automatization of the process of preparing bills for the subscribers of said exchanges for calls made.

In known solutions of that problem, the metering pulses are directed to electromechanical message registers, being counted there, whereby the readouts of appropriate counters are taken visually. That is the basic obstacle for the complete automation of the process of preparing bills for the subscribers for calls made.

In exchanges with crossbar switches and in electronically controlled exchanges, automatic metering devices are employed. Therein the identification of the subscriber is performed, individual registering device being employed for every one repeater, which records telecommunication calls effected by means of said repeater. These are very extended systems inconvenient in operation. It is, therefore, an object of the present invention to provide a simple arrangement for registering and reading of metering pulses, to be employed in any telephone or Telex exchange without requiring substantial modifications in the equipment of said exchange.

According to the present invention the arrangement for registering and reading of message units in telephone or Telex exchanges comprises electrochemical integrators with one of their electrodes connected to the mass, with the other one connected over a resistor with wires supplying the metering pulses to the individual exchange line equipment. The same electrode, by means of a commutator, is connected with the reading arrangement which involves a threshold device detecting the voltage increase across the integrating device. The output of a single generator of standard square pulses having their polarization opposite to that of the metering pulses is connected to an AND gate, one output of which is connected with an electronic pulse counter, while the other input of said gate is connected to said threshold device, the output of said electronic pulse counter being connected with a device registering the readouts.

Preferably, said electrochemical integrators get subsequently connected to the reading device or in any selected sequence, while electrodes of said electrochemical integrators are connected to the reading device in any selected sequence.

Moreover, the equipment of the individual exchange line, connected in series with the resistor, includes a capacitor, where to the connecting point of said capacitor with said resistor the cathode of a diode is connected, the anode of which is connected to the mass.

The arrangement according to the invention is thus relatively simple in technological realization, it does not require substantial modifications of devices and wirings of the exchanges, and moreover it employs only one reading device for servicing a great number of exchange lines.

DESCRIPTION OF THE PREFERRED EMBODIMENTS

The novel features which are considered as characteristic for the invention are set forth in particular in the appended claims. The invention itself however, both as to its construction and its method of operation, together with additional objects and advantages thereof, will be best understood from the following description of a specific embodiment when read in connection with the accompanying drawing.

Referring to FIG. 1, the arrangement for registering and reading of message units according to the invention is provided with individual equipment 1 of the exchange line, including a capacitor C1 connected in series with the resistor R1, where between said capacitor and said resistor, the diode cathode D1 is connected, the anode of which is connected to the mass. The other terminal of the resistor R1 is connected with the field of the commutator 3, and with one of electrodes of the E-cell integrating device 2 the other electrode of which is connected to the mass. All the other devices of exchange lines having a similar structure are connected to subsequent positions in the field of the commutator 3. The output of the commutator 3 is connected to the input of the reading device 6 comprising the threshold device 5, the square pulse generator 4, the product gate 7, the electronic pulse counter 9 and the commutator control device 8.

The output of the reading device, the commutator control device 8, and the electronic pulse counter 9 are connected with the registering device 10.

The input of the reading device 6 is connected to the base of the transistor T1 which together with the resistors R2 and R3 constitutes the threshold device, the collector of the transistor T1 being connected with one of the terminals of the resistor R3, the other terminal of which is connected with the negative pole of the supply source, while the emitter is connected to the mass. To the collector of the transistor T1 there is connected one input of the AND gate 7 together with the resistor R3 and with the input of the control device 8. The base of the transistor T1 of said threshold device is via the resistor R2 connected with the output of the square pulse generator 4 generating pulses having a polarization opposite to that of the metering pulses. Furthermore, the output of the generator 4 is connected to the second input of the AND gate 7, the output of which is connected to the input of the electronic pulse counter 9.

The arrangement operates as described below. The metering pulses designed for actuating the electronic pulse counter are directed, through the wire m, also to the metering input of the equipment of the exchange line 1. Said pulses are led over the resistor R1 to the integrator 2 (electrochemical E-CELL) wherein they cause a transfer of active material from the passive electrode to the active one, the amount of the active material being transferred being constant for every one metering pulse. On finishing the billing period, the reading device 6 is connected through intervention of the commutator 3 to the individual equipment of exchange line 1. The reading device 6 may be connected to separate individual devices of exchange lines 1 subsequently or in any sequence determined by the reading program involved in the commutator control device 8. The square pulses from the pulse generator 4 are led to the AND gate 7, and over the resistor R2 and closed contact of the commutator 3 to the electrode 2 of the electrochemical integrator E-CELL in individual equipment of the exchange line 1. Moreover, said pulses, having their polarization opposite to that of the metering pulses, cause a transferring of the active material from the active electrode onto the passive one, in the same amount as for every one reading pulse as well as every one registering pulse. Simultaneously, the reading pulses led over the open AND gate 7 are counted by means of the electronic pulse counter 9. The active electrode 2 of the electrochemical integrator E-CELL is completely deprived of the active material when the number of reading pulses gets equal to that of pulses being recorded. Each subsequent pulse from the generator 4 causes a violent increase of the voltage over the terminals 2 of the electrochemical integrator E-CELL causing overcontrolling of the transistor T1, a decrease of the voltage of its collector, and closing of the AND gate 7. The electronic pulse counter counts exactly as many reading pulses as were delivered to the electrochemical integrator 2 E-CELL during the registering process. Through the wire connected to the collector of the transistor T1, information is transmitted to the control device 8 that the reading is completed and the integrator being read out is reduced to zero. The commutator control device 8 transmits to the registering device 10 the position number of commutator 3 being the subscriber's number whose electrochemical integrator 2 E-CELL has been read. The position number of the commutator together with the result of reading, recorded transiently by the electronic pulse counter 9, is transmitted to the registering device 10, and, for example, punched on a perforated paper tape. Then the commutator control unit 3 causes an opening of the contact being closed hitherto, and further a closing of the next contact or any other, depending on the operating program of the control device 8.

The reading of the remaining metering equipments of exchange lines is performed in a similar manner.

The commutation may be realized either by a commutator in the form of a cross-bar switch or by means of a matrix of relays controlled by the controlling device 8.

Preferably the resistor R1 should be connected in series with the capacitor C1 to achieve an independence from the pulse duration, due to transfer of the same charge value, being determined by the product of voltage of the metering pulse and of capacitance.

What is claimed is:

1. An arrangement for registering and reading message units in telephone or Telex exchanges comprising, in combination, electrochemical integrators, each having a first electrode connected to ground potential and having a second electrode, sources connected to corresponding integrators and supplying metering pulses to said integrators, a resistor connected between each source and the second electrode of the corresponding electrochemical integrator, a reading system for reading the outputs of said integrators, a commutator with a plurality of positions connecting selectively the second electrode of an integrator with said reading system, said reading system comprising a threshold device detecting an increase of voltage across the terminals of an integrator which is connected to said reading system, said threshold device having an output, and a generator generating standard square-wave pulses having their polarization opposite to that of the metering pulses, an AND gate having a first input connected to said generator and having a second input connected to the output of said threshold device, a pulse counter connected to the output of said AND gate for counting gated pulses from said generator, said pulse counter having an output, means for controlling the commutator and having an output for indicating the commutator position, and means connected to the output of said pulse counter and the output of said controlling means for registering pulses read out from said integrators and for registering the respective commutator position.

2. The arrangement as defined in claim 1, wherein said integrators are each connected one after another to said reading system.

3. The arrangement as defined in claim 2, wherein said integrators are each connected to said reading system in a freely determined sequence.

4. The arrangement as defined in claim 2, including a capacitor connected in series with each of said resistors, and a diode with cathode connected to the junction between each of said capacitors and the corresponding resistor, each of said diodes having an anode connected to ground potential.

* * * * *